Sept. 19, 1933.  E. F. ZAPARKA  1,927,535
AIRCRAFT
Filed Oct. 3, 1929  4 Sheets-Sheet 1
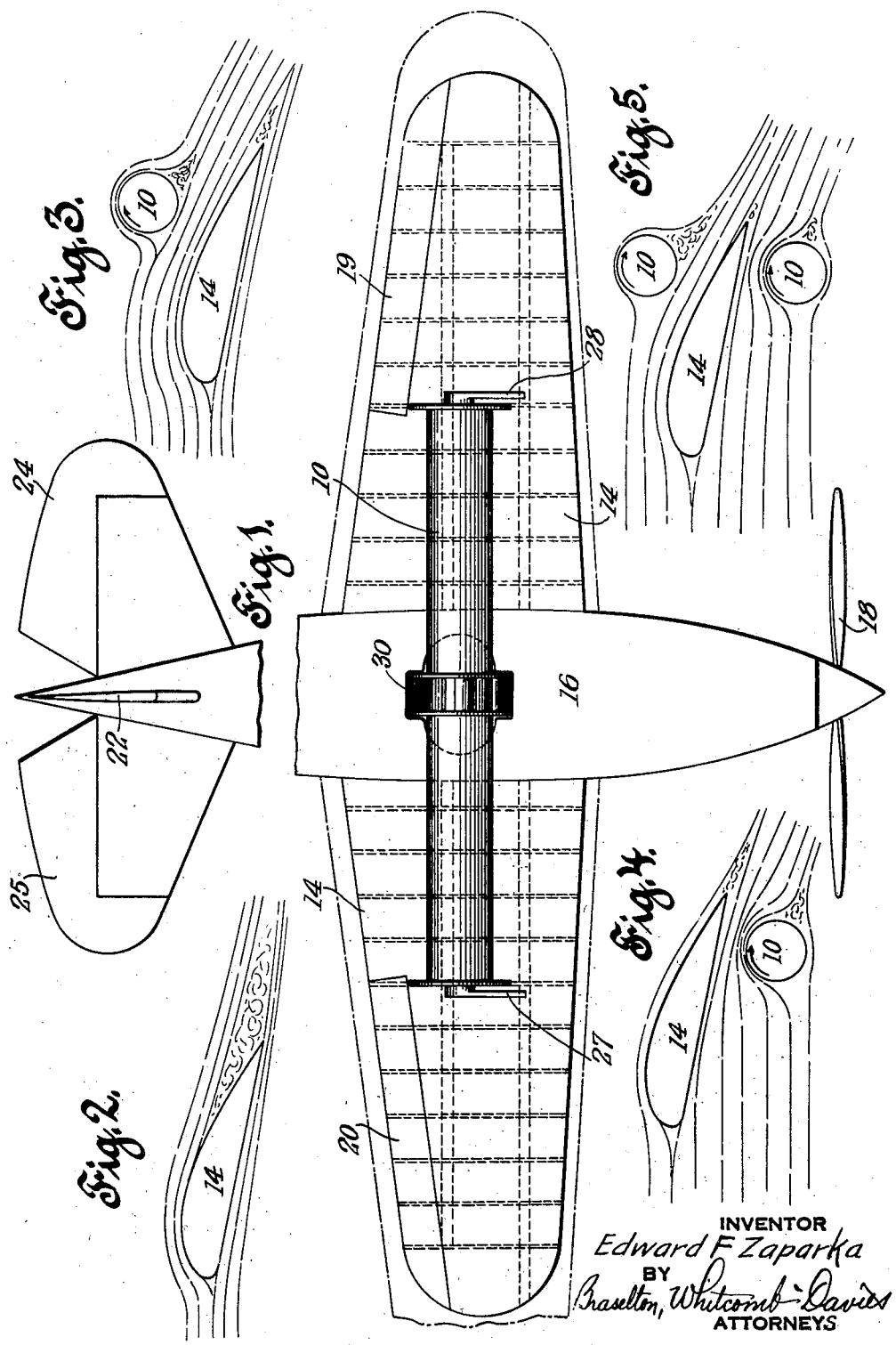
INVENTOR
Edward F Zaparka
BY
Haselton, Whitcomb Davies
ATTORNEYS Sept. 19, 1933.    E. F. ZAPARKA    1,927,535
AIRCRAFT
Filed Oct. 3, 1929    4 Sheets-Sheet 2
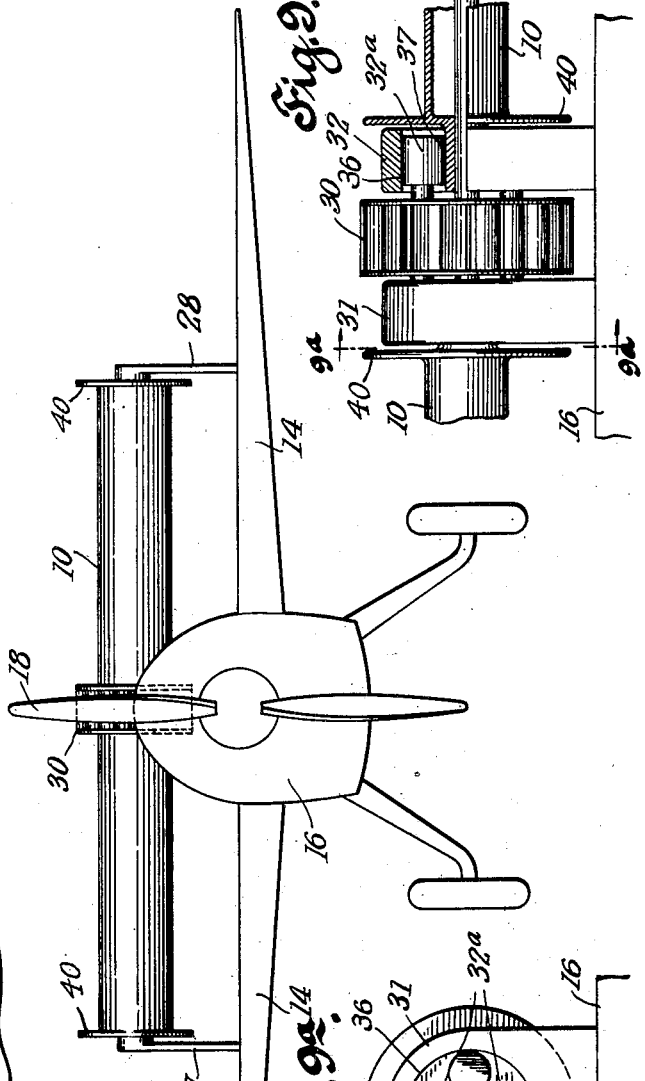
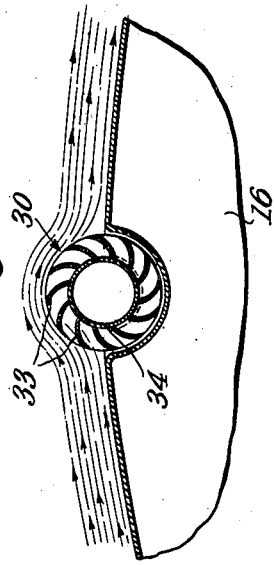
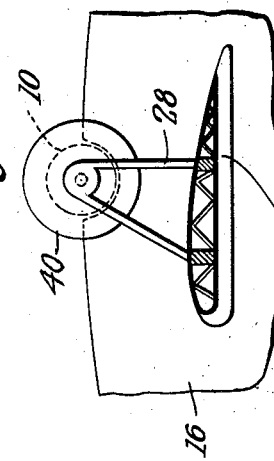
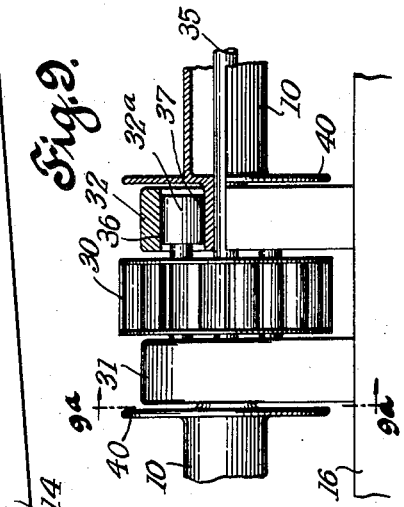
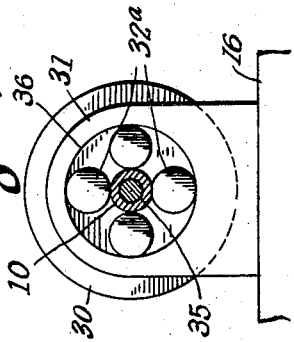
INVENTOR
Edward F. Zaparka
BY
Braselton, Whitcomb Davies
ATTORNEYS.

Sept. 19, 1933.   E. F. ZAPARKA   1,927,535
AIRCRAFT
Filed Oct. 3, 1929   4 Sheets-Sheet 3
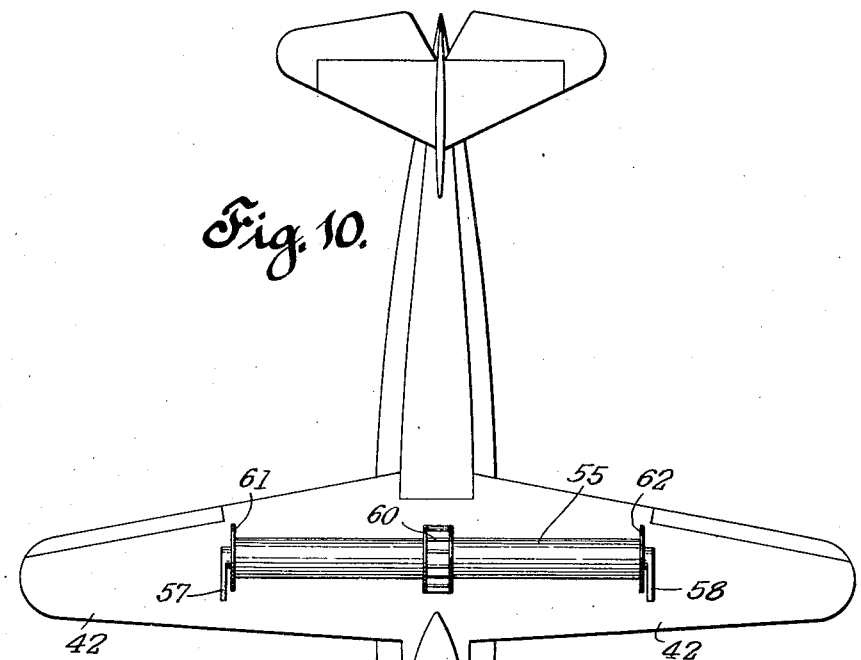
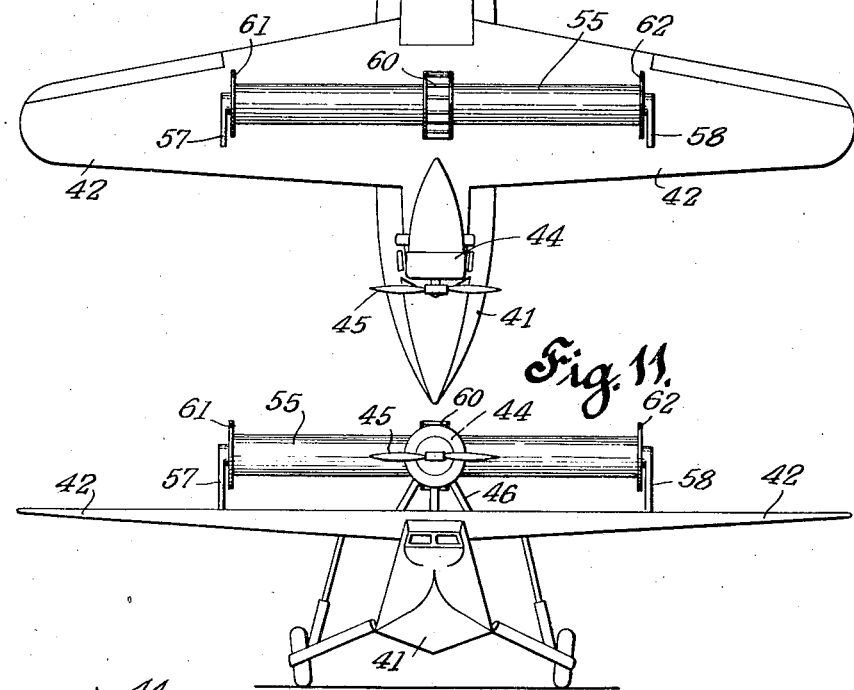
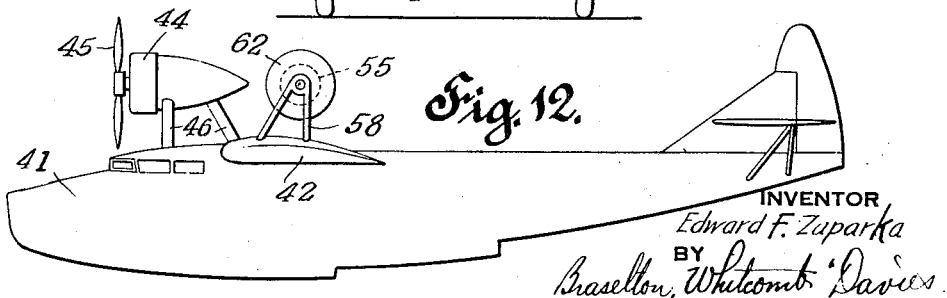

Sept. 19, 1933.  E. F. ZAPARKA  1,927,535
AIRCRAFT
Filed Oct. 3, 1929  4 Sheets-Sheet 4

INVENTOR
Edward F Zaparka
BY
Braselton, Whitcomb Davis
ATTORNEYS.

Patented Sept. 19, 1933

1,927,535

UNITED STATES PATENT OFFICE

1,927,535

AIRCRAFT

Edward F. Zaparka, New York, N. Y., assignor to Zap Development Corporation, Wilmington, Del., a corporation of Delaware Application October 3, 1929. Serial No. 396,977

3 Claims. (Cl. 244—14)

This invention relates to an improved aircraft utilizing aerodynamic reactions for its sustaining properties, applicable to land, sea, and amphibian types.

An object of the present invention is to provide a lifting unit combined with a movable means inherent in itself to provide a lifting force by causing such a change in the direction of the approaching air stream as to produce a lifting force of substantially greater proportions per given area of sustaining surface. The component elements of said lifting unit and said movable means also are so combined or associated in a novel manner as to cooperatively greatly enhance the total resultant sustaining effects in the aircraft.

In various embodiments of my added lift producing means, I cause a material slowing up of the approaching air on the lower side of said means, or a body carrying said means, and materially speed up the velocity of the air on the upper side thereof, thereby increasing the lift and reducing the drag, a fundamental feature of the present invention involving the relative location, association or combination of such means and a standard type of airfoil which may be modified in size, shape, or dimensions, as to obtain new combined effects, greatly in excess of known constructions.

The present invention also contemplates means to provide a moving air stream by revolving a stream of air itself adjacent a body, revolving or moving a skin surface of a body, revolving a cylinder or other shaped body to produce the effects referred to, or producing said effects by the employment of such means as will be apparent to those skilled in the art, including those types of devices which have been considered as utilizing in effect a Magnus action all or some one type of the same in combination with a stationary airfoil producing a greatly enhanced resultant aerodynamic efficiency.

A further object of the present invention is to provide means in which the moving skin or body is materially increased in speed, as the lifting effects produced vary in proportion to the second power of the speed, or the velocity squared.

This invention further includes the location of said moving airfoil in such a position relative to the stationary airfoil as to be in the stream flow produced by the latter and so that with a high angle of attack the tendency of lowered efficiency of the stationary airfoil is overcome by the moving airfoil.

Further objects of the combined arrangement hereinbefore indicated are to provide an aircraft of reduced cost in that the standard type airfoil may be reduced in size and replaced by moving or rotating elements which is many times more efficient per unit of size and to produce an aircraft of the kind indicated which will have a much smaller total exposed portion to be affected by variations in pressure of winds, air currents, cross currents, increases and decreases in density and the like, all of which will be appreciated by those skilled in the aircraft art.

A further object of the present invention is to provide an aircraft utilizing a movable surface airfoil in combination with a stationary airfoil in which said moving surface may operate independently of the propeller by the air stream or independently of a direct connection with the source of motive power, thereby providing safety factors or features inherent in the aircraft construction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a top plan view of an airplane incorporating the sustaining and lifting devices of my invention;

Figure 2 is a diagram illustrating the air currents and the resultant forces adjacent to an airfoil;

Figure 3 is a diagram illustrating the air currents and the resultant forces adjacent to the sustaining and lifting devices of my invention;

Figure 13:
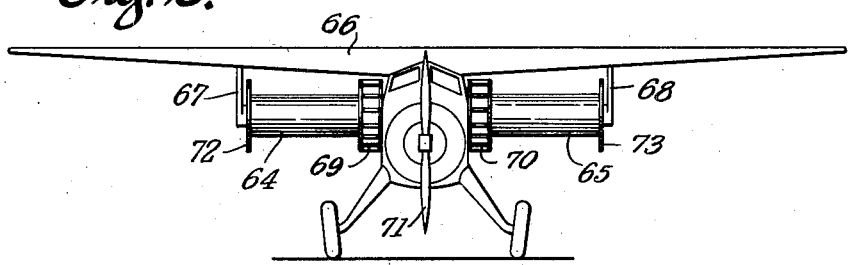
Figure 14:
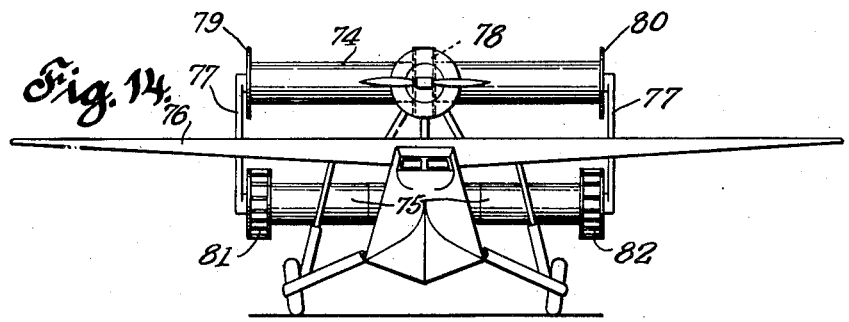
Figure 15:
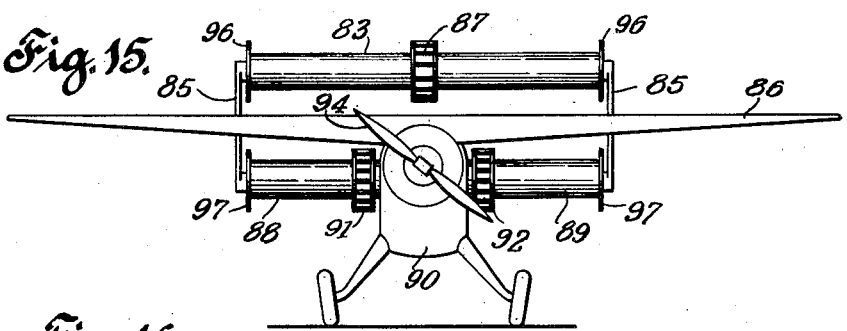
Figure 16:
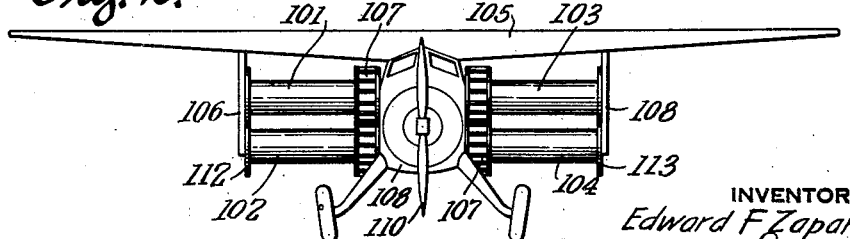

Figures 4 and 5 diagramatically illustrate different arrangements of the sustaining and lifting devices and the air currents and resultant forces adjacent thereto;

Figure 6 is a front elevation of the airplane shown in Figure 1;

Figure 7 is a side view showing in detail the supporting means for the movable lifting element of my invention;

Figure 8 is a sectional detail view illustrating an air turbine used for driving the movable lifting element;

Figure 9 is a sectional detail view showing the air turbine and the speed multiplying means for driving the movable lifting element;

Figure 9ᵃ is a cross sectional view taken substantially on line 9ᵃ—9ᵃ of Figure 9;

Figure 10 is a top plan view of an amphibian type plane incorporating my sustaining and lifting devices;

Figure 11 is a front elevational view of the amphibian plane shown in Figure 10 with a landing gear;

Figure 12 is a side view of the amphibian plane with the undercarriage changed for water landing;

Figure 13 is a front view of an airplane showing another arrangement in the combination of the sustaining and lifting devices;

Figure 14 illustrates an amphibian type plane incorporating a modified form of the combined sustaining and lifting devices of my invention;

Figure 15 illustrates an airplane incorporating a modified form of the combined sustaining and lifting devices;

Figure 16 illustrates an airplane incorporating still another arrangement of the combined sustaining and lifting devices.

Referring to Figures 1 and 6 of the drawings, I illustrate one embodiment of my combined stationary airfoil and moving sustaining elements in which 10 indicates the revoluble sustaining element such as here shown in the form of a rotor or moving surface which may be one unit of a plurality of units. The airplane incorporating my invention as here illustrated comprises a main stationary airfoil or wings 14 secured to the fuselage or main body portion 16 carrying a suitable engine or prime mover adapted to drive propeller 18. The ailerons or side stabilizers are indicated at 19 and 20. The rudder or flight direction control is indicated at 22 and the elevators are indicated at 24 and 25.

The movable sustaining element 10 adapted to produce a lifting force by the Magnus effect and improve the lifting efficiency of the airfoil in the manner hereinafter described is here shown in the form of a cylinder or might be cone or other shape of substantial length compared with its diameter. The elements 10 may be of metal, wood, rubber, silk, cloth or any fabric suitably treated for protecting the same from the action of the elements. As here illustrated, the sustaining element is journaled at its outer end for rotative movement upon brackets 27 and 28 fixedly secured to the airplane wings or main airfoils 14 as shown in Figure 7. It is to be understood that the sustaining element can be carried in any part of the aircraft, as for example, by the fuselage or main airplane support.

I find that an air turbine can be used very effectively to impart rotative movement to the movable element 10, but it is to be understood that such movement can be imparted to said element by other suitable means as, for example, by the engine adapted to drive the propeller 18 or other separate source of power. In the embodiment shown in Figures 1 and 6, the movable sustaining element 10 is driven by an air turbine 30 located at its middle portion and fixedly secured in any well known manner to said element or it may be constructed as forming an integral part therewith.

As shown in Figure 8, turbine 30 consists of a series of radially disposed blades 33 fixed to a hub portion 34 secured to the sustaining movable element 10. The air driven turbine 30 is so placed with respect to the propeller and the main stationary airfoil that it may obtain its rotative movement by the slip stream resultant from the movement of said propeller or by the air stream independent of the propeller action.

I have found that the resultant lifting effect of the combined sustaining and lifting devices of my invention can be materially increased by increasing the rotative speed of the movable element associated with the airfoil in relation to the velocity of the air currents adjacent thereto. In order to obtain the desired increase in the rotative movement of the movable element, I provide a multiplying gear connection between the turbine wheel 30 and the movable element 10. As shown in Figures 9 and 9ᵃ, the turbine 30 is suitably carried by shaft 35 which in turn is supported by brackets 27 and 28 fixed to the airfoil or stationary lifting element 14. Turbine 30 imparts its rotating movement to the moving surfaces or sustaining element 10 by means of a friction roller 32ᵃ suitably carried by the turbine 30 cooperating with an inner stationary friction surface 36 forming part of the uprights 31 and 32 which are carried by the fuselage or main supporting element 16, and friction gears 37 respectively secured or forming integral part of the sustaining element 10. It can be seen that by this drive the movable element rotates at a greater speed than the air turbine 30.

Connected to the outer end of each sustaining element are cylindrical discs 40 of greater diameter than that of the sustaining element 10 and are used for confining the air currents and preventing the same from spreading off the outer ends.

I have illustrated in Figures 10 to 12 inclusive, one form of my invention as incorporated in an amphibian type plane, the plane comprising a hydroplane fuselage 41 to which wings or main airfoils 42 are secured. A suitable engine 44 adapted to drive propeller 45 is supported by a frame 46 to the forward portion of fuselage 41. The airfoil and fuselage are provided with the necessary horizontal and vertical controls. The movable sustaining device comprises a horizontally disposed revoluble cylinder 55 suitably journalled at its outer ends upon brackets or supports 57 and 58 fixedly secured to the airplane wings or main airfoils 42. The air driven turbine 60 is suitably connected to the revoluble cylinder 55 for driving the same. Turbine wheel 60 is preferably located in the area of the air slip stream resulting from the action of the propeller 45 while in motion, and it can obtain its rotative movement by the action of the slip stream, or by the air stream produced by airplane movement with respect to the surrounding air. It can be seen that the lifting force of my sustaining devices is independent of action of the propelling apparatus. Obviously if the engine becomes inoperative or stalls, the lifting action of the sustaining devices of my invention is not rendered ineffective thus preventing rapid descents and will increase flight stability and the degree of safety of an airplane incorporating my sustaining device.

In order to confine the air currents and prevent the same from spreading off the outer end of the sustaining element, it is provided at its outer ends with cylindrical discs 61 and 62 of greater diameter than that of the sustaining element.

In the form shown in Figure 13, the sustaining element comprises two horizontally disposed revoluble cylinders 64 and 65 positioned below the stationary airfoil 66. The revoluble sustaining elements 64 and 65 are suitably journalled at their outer ends upon brackets or supports 67 and 68 respectively, the brackets being fixedly secured to the stationary airfoil 66. Connected at the inner end of each sustaining element are turbine driven wheels 69 and 70 which may obtain their rotative movement by the slip stream resulting from the action of propeller 71. The cylindrical discs 72 and 73, of greater diameter than that of the sustaining element, are located at the outer end of the sustaining elements 64 and 65 acting to confine the air current preventing the same from spreading off, thereby increasing the lifting efficiency of said elements.

In the form of my invention shown in Figure 14, the movable sustaining element comprises two movable rotating cylinders 74 and 75 located adjacent the upper and lower surfaces of the airfoil 76 of an amphibian type plane. Upper cylinder 74 is suitably journalled at its outer ends upon brackets 77 suitably supported by the airfoil 76. A turbine 78 is suitably positioned in the air stream of the propeller of said amphibian plane and adapted to impart the desired rotative movement to said movable element 74. The revoluble sustaining element 75, in the form shown, comprises two units suitably supported and similarly spaced from the airfoil 76 extending in opposite direction from the fuselage of the airplane. Each unit of the sustaining element is driven by an air turbine located at the outer end of each unit suitably secured to the airfoil 76. The turbines 81 and 82 impart a rotative movement to the movable sustaining element by the air stream produced by the movement of the airplane through the air. It can be seen that by the arrangement here illustrated a greater stability can be obtained and a nose dive or very rapid acceleration in the descent of the plane can be avoided as the sustaining element will be driven while the plane is in motion, and its sustaining and lifting action will always be present when in motion.

To increase the lifting efficiency of the sustaining element 74, I provide cylindrical discs 79 and 80, the same being of a greater diameter than that of the sustaining element, and located at the outer end of said element in order to confine the air current preventing its spreading off.

In the form of my invention shown in Figure 15, the sustaining elements are similarly arranged with respect to the airfoil. In this figure I have illustrated the movable sustaining element as comprising a rotor element 83 horizontally disposed and suitably journalled at its outer ends upon brackets 85 fixedly secured to the upper surface of the airfoil 86 of the airplane here shown. Turbine 87 is adapted to drive the movable element 83. The movable element shown below the airfoil 86 comprises two horizontally disposed units 88 and 89 adjacent to the fuselage 90 and extending in opposite directions. These units are suitably journalled and are supported by the airfoil 86, and are driven by air turbines 91 and 92 located at the respective inner ends. In this arrangement of my invention the air turbines 87, 91 and 92 receive their rotative movement from the slip stream resulting from the propeller 94 of the plane while the same is in action. It is to be understood that the rotative movement can also be imparted by the action of the air stream produced by the movement of the airplane while in flight.

Discs 96 and 97 of a larger diameter than that of the sustaining elements, are provided at the outer ends of the sustaining elements in order to confine the air current acting on said sustaining elements and prevent the same from spreading off at the outer ends, increasing thereby the lifting action of the sustaining elements.

In the form shown in Figure 16, the sustaining element comprises a plurality of revoluble cylinders 101, 102, 103 and 104 horizontally disposed and suitably positioned with respect to the main airfoil 105 and its stream flow cylinders 101 and 102 are suitably journalled at their respective outer ends upon frame 106 secured to the main airfoil 105 of the monoplane herein illustrated. Cylinders 103 and 104 are suitably journalled at their respective outer ends upon frame 108 also carried by the airfoil 105. Each revoluble cylinder carries at its inner end air driven turbine wheel 107, these turbines being located at each side of the fuselage 108 carrying the main airfoil 105. These turbine wheels are formed with a plurality of radially extending blades, and are adapted to receive their rotative movement by the slip stream resulting from the motion of propeller 110.

Discs 112 and 113 of a greater diameter than that of the sustaining elements, are secured to their outer ends in order to confine the air current acting on each sustaining element and preventing the current from spreading off at the outer ends increasing thereby the lifting action of each sustaining element.

*Operation*

In Figure 2 of the drawings I have illustrated in diagrammatic form the direction of air currents and the resultant forces adjacent to a standard type of airfoil whether moved itself or a stream of air is forced by the same. It can be seen that there is produced a pressure increase on the lower surface of the airfoil in comparison with a pressure decrease on the upper side as will be understood by those skilled in the art, this tending to elevate or sustain in air the airfoil. If a movable element 10 illustrated in Figure 3 or Figures 4 and 5 as well, is located adjacent the stationary airfoil 14 and a rotative movement is imparted thereto or its skin surface is moved in the direction indicated by the arrow, there will be seen that in addition to producing a lifting effect from the Magnus action or that inherently due to the movement of its own surface, a flow of air from the rotating element 10 is produced adjacent to and effecting the stream line flow from the stationary airfoil 14 and I have discovered that by this association of elements I greatly increase the lifting or sustaining power of the airfoil 14.

The reason for the same I am not at present fully aware, but believe that the velocity for one thing of the surrounding air stream of the stationary airfoil 14 is increased by the resultant action of the air flow from the rotating element 10. Moreover I believe that this not only effects an increase in velocity, but produces other results which may add and effect in obtaining the increase to which I have referred. As a result of this action, I am able to greatly increase the angle of attack before the stalling or "burble" points for the stationary airfoil 14 is reached. A further result of this is that I produce an aircraft which may climb at steeper angles, is more efficient when moving relatively horizontally, is more stable and costs less compared with a plane of the same carrying capacity. Moreover on descent I have provided a construction which will permit a steeper angle to be used particularly because the lifting effect of the rotating element 10 remains the same, whereas the craft may be so angled that the stationary airfoil 14 may have a negative effect as this is determined by the tail controls, whereas the effect of the rotating element 10 is independent thereof. Thus in ascending the stationary airfoil 14 and the rotating element 10 coact to provide a steep climb, whereas on descending the action of the airfoil 14 is subtracted from that of the rotor 10 permitting the aircraft to come down at a steeper angle without unduly increasing the velocity of descent.

It is to be understood that throughout a standard construction of airplane or aircraft is employed, unless modified as hereinabove indicated, as to the size, for example, of the airfoils and to receive the variations in such standard construction necessary to incorporate the added features in the form of the cylinders or auxiliary lifting mechanism.

It is apparent that, within the scope of the invention modifications and different arrangements may be made other than is herein disclosed and the same could be used in different environments, the present disclosure being illustrative merely, the invention comprehending all variations thereof.

What I claim is:

1. In an aircraft having a fuselage and an engine, the combination of a stationary airfoil; a movable Magnus producing airfoil positioned to one side of the plane of the stationary airfoil; a propeller for the aircraft driven from the engine; an air turbine located to receive air from said propeller; speed increasing driving connections between said turbine and said movable airfoil; and means whereby said turbine receives only that portion of propeller air stream to advance the turbine.

2. In an aircraft, the combination of an airfoil; a rotating cylinder adapted to produce a lifting effect; a turbine; speed increasing means to drive said cylinder from said turbine, said cylinder being located adjacent the trailing edge of said airfoil to remove eddy formations adjacent the rearward portion thereof, and to modify the stream line flow from said airfoil to increase the lifting effect of the rearward portion thereof.

3. A plurality of lifting units, one of said units having a movable cylindrical surface and said units being so positioned that the cylindrical surface is adjacent the trailing edge of the other unit to permit air flow from said movable surface to modify the air flow from said unit to increase the lifting action thereof; and means to move said movable cylindrical surface at an increased speed with respect to the velocity of the approaching air stream.

EDWARD F. ZAPARKA.